June 3, 1969     J. ASHLEY ET AL     3,447,873

FILTER GRATING MONOCHROMATOR

Filed March 10, 1966

INVENTORS
JOSEPH ASHLEY
GERALD T. KEAHL
BY
*Paul L. Harder*
ATTORNEY

United States Patent Office 3,447,873
Patented June 3, 1969

3,447,873
FILTER GRATING MONOCHROMATOR
Joseph Ashley, La Habra, and Gerald Thomas Keahl, Fullerton, Calif., assignors to Beckman Instruments, Inc., a corporation of California
Filed Mar. 10, 1966, Ser. No. 533,191
Int. Cl. G01j 3/18
U.S. Cl. 356—100          2 Claims

ABSTRACT OF THE DISCLOSURE

There is disclosed an improved filter-grating monochromator in which an interference filter is associated with a diffraction grating to provide order separation of the wavelengths dispersed by the grating. The interference filter is continuously variable and is driven in synchronism with the diffraction grating. In a second embodiment one or more reflection interference filters provide for multiple reflections of the radiation in the monochromator beam path to provide improved spectral purity.

---

This invention relates generally to high resolution monochromators and more particularly to an improved filter-grating monochromator.

Reflection diffraction grating monochromators are often utilized in spectrophotometric systems because of the well-known advantages of the diffraction grating over prisms. One disadvantage of the grating is that the diffraction grating will generally disperse radiation of a single wavelength impinging thereon on discrete, different directions with the different directions identified as first order radiation, second order radiation, third order, etc. If a beam of heterochromatic radiation is impinged on the grating, the direction of the first order diffraction of one wavelength in the beam will coincide with the direction of higher order diffraction of the other wavelengths. In order to scan a spectral range including such wavelengths by rotating the grating to direct different wavelengths through a slit, impinging radiation of wavelengths of interfering orders which would otherwise pass through the system must be excluded or sorted by suitable means.

Some prior art monochromators utilize filters to provide this exclusion, commonly known as order sorting. These systems utilized a series of filters, each passing a relatively wide band of the spectrum. These prior art filter-grating systems in general produce higher stray light than that which is generally achieved in the nearly optimum prism-grating monochromator. In these instruments a single filter is utilized over a relatively wide range of scan of the grating and it is necessary to change filters during the course of a complete scan of the spectrum. In many instances it is necessary to change filters in the middle of a scanning operation rather than at an order break or grating change region. This change of filters during a scanning operaton ofttimes causes a discontinuity in the spectrum at the change point. These discontinuities, commonly called "filter spikes," are caused by (1) changes in the background energy at the filter change, e.g., the transmission of one filter is substantially different from that of the new filter at the same wavelength and the resultant change in transmitted energy causes the servo operated system to change its response characteristics; (2) the filter changes during a reference or sample radiation pulse causing a change in energy in this pulse with respect to the others and this causes a real spike or transient to occur on the recorded spectrum; (3) mechanical transients caused by the mechanical mechanism utilized to change the filters result in electronic microphonic pick-up which cause a greater noise level and a resultant change in the signal-to-noise ratio during the change period. These mechanical transients are created by the necessity of changing the filters in a short time interval which generally results in the utilization of a high speed mechanical changing mechanism which causes a mechanical shock in the system.

A further disadvantage of the prior art filter-grating system is that the use of broad-band filters has necessitated the use of multiple gratings in monochromators covering a wide wavelength range. The prior art filters are generally opaque to radiation below a given wavelength, being highly transmissive above that wavelength. This means that the grating cannot conveniently be used in the lower orders unless a narrow band-pass filter is utilized because of the presence of higher order radiation.

Figure 1:
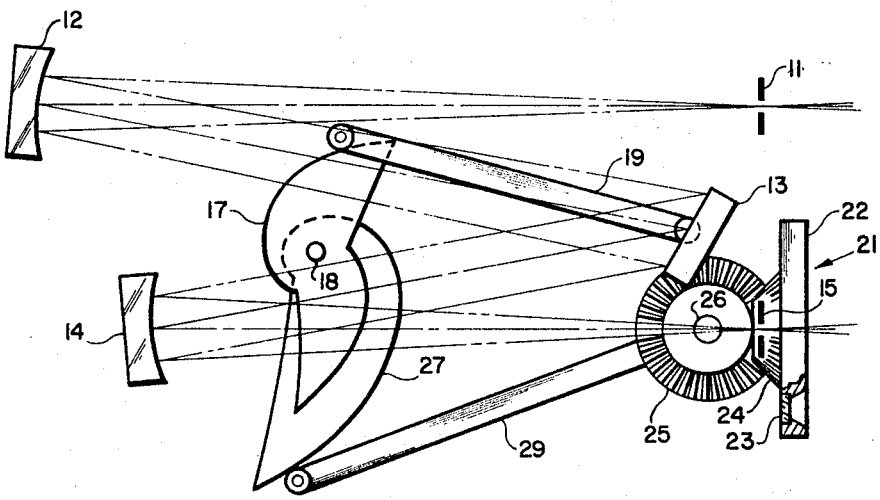
FIG. 1 is a schematic representation of a preferred embodiment of a filter-grating monochromator constructed according to the teachings of this invention.

Referring now to the drawing and more particularly to FIG. 1, radiation from any suitable source, not shown, enters the monochromator through entrance slit 11 and is directed by a collimating mirror 12 to grating 13 where it is dispersed in a conventional manner. Dispersed radiation from the grating falls on collimator 14 and is focused thereby on exit slit 15. Dispersed radiation may be scanned past the exit slit in a conventional manner by rotating grating 13 by any suitable scanning drive mechanism. One conveniton al drive mechanism is provided by grating cam 17 rigidly affixed to shaft 18 driven by a grating scan motor, not shown. Grating 13 is coupled to cam 17 by the grafting cam follower arm 19. Grating cam 17 is of the multi-lobe type and as is well known, may provide for scanning grating 13 over two or more orders. While only a single grating has been illustrated it should be understood that multi-grating turrets have been utilized in grating monochromators of the prior art with mechanisms provided for changing gratings such that the monochromator may provide a continuous spectrum over a wide region. While only a single grating is illustrated in the monochromator of FIG. 1, this invention is equally applicable to multi-grating monochromators.

Figure 2:
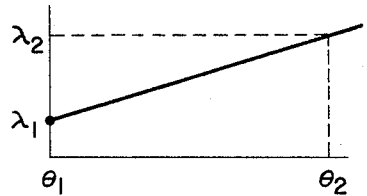
FIG. 2 illustrates the change in wavelength as a function of position of the filter of FIG. 1.

To provide for order sorting, a variable interference filter generally indicated at 21 is provided in the radiation beam path adjacent exit slit 15. Variable interference filters are generally produced by a carefully designed stack of layers of alternate high and low refractive index material on a suitable substrate. The layers may be deposited by vacuum evaporation on a substrate material such, for example, as quartz, sapphire or germanium, depending upon the wavelength region involved. By applying the coatings to the substrates such that the thickness of each layer varies linearly along the substrate, a wavelength band transmitted by a small segment of the filter will also vary linearly along the filter. If the coatings are applied to a circular blank of substrate material, such that the thickness of each layer varies linearly as a function of angle, the wavelength transmitted by the resultant filter will also vary linearly as a function of angle. By proper design, a narrow band-pass filter can be produced that has a wavelength which varies linearly as a function of angle. The wavelength characteristics of such a filter as a function of angle are illustrated in FIG. 2. This narrow band-pass filter may be utilized to eliminate unwanted orders in the radiation dispersed by grating 13.

In the embodiment of FIG. 1 a circular variable interference filter has been provided and comprises filter wheel 22 and wedge filter 23. A bevel gear 24 may be affixed to or integrally formed with filter wheel 22 and engages a second bevel gear 25 rotatable about axis 26. Filter cam 27 is rigidly affixed to grating drive shaft 18. A filter cam follower arm 29 is secured to shaft 26 and rotates bevel gear 25 as cam 27 rotates. By appropriate selection of the gear ratio between bevel gears 24 and 25 full rotation of filter wheel 22 may be obtained while bevel gear 25 translates over a relatively small angle.

Figure 3:
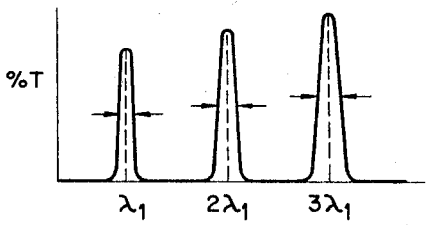
FIG. 3 illustrates the transmission band-pass characteristic of the filter at three different angular positions.

FIG. 3 illustrates the transmission characteristics of a circular variable interference filter which has been designed to have a linear change in wavelength as a function of angle. Curve 31 illustrates the transmission characteristics of the filter at $\lambda_1$ and the half intensity band width is indicated by the arrows. If the filter is now moved to a wavelength equal to $2\lambda_1$ the transmission characteristic is illustrated by curve 32 and the half intensity band width is twice that at $\lambda_1$. Similarly, at $3\lambda_1$ Similarly, at $3\lambda_1$ the half intensity band width is three times that of $\lambda_1$ as illustrated by curve 33. For maximum benefit, the slit is placed as close to the narrow band pass side of the filter as is possible, the spacing generally being a few thousandths of an inch. As is common in most monochromators the exit slit 15 will be located at an image point. This places the narrow band width side of the interference filter at substantially the image point. The slit may be made variable as is common in most monochromators but this is not essential and fixed slits may be utilized.

Figure 4:
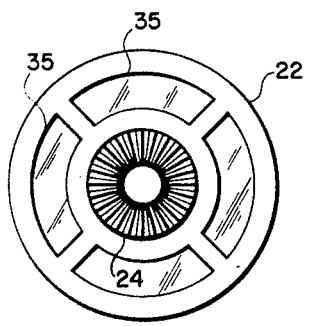
FIG. 4 illustrates a plan view of a second filter for use in the monochromator of FIG. 1.

Referring now to FIG. 4 there is illustrated a plan view of an alternative embodiment of a circular variable filter in which a plurality of filter sectors 35 are provided within filter wheel 22. Design considerations and manufacturing techniques may make it undesirable to provide a singular circular substrate with a continual, linearly variable wavelength over the entire region. It may be desirable to provide a plurality of filter sectors within the filter wheel. It may also be desirable to provide interference filter sectors which have a different rate of change of wavelength as a function of angular rotation, i.e., the wavelength versus angular position curve of the sector wheel would differ in slope from that illustrated in FIG. 2, although it may remain linear. The rate of angular rotation of filter wheel 21 may be appropriately controlled by design of filter cam 27. It is further apparent that any discontinuity in the resulting recorded spectrum by virtue of the spacing between any filter sector may be taken care of by providing an adequate control of the cam and chart drive motors in a manner similar to that disclosed in U.S. Patent 2,948,185, assigned to the assignee of the instant invention. It is further apparent that grating 13 may be held stationary while filter wheel 21 continues to rotate allowing transfer from one filter sector to another by providing a region of constant radius on grating cam 17. It may also be desirable to provide an overlap in the wavelength region between adjacent ends of the variable interference filter sectors to insure a continuous spectrum.

While a circular variable interference filter has been disclosed in the embodiment of FIG. 1 with appropriate modification the interference filter may be formed on a linear substrate. In such a filter, the wavelength may be made to vary linearly as a function of filter position.

It should be noted that with the "spike" shaped band pass of the interference filter the grating may be used over multiple orders since lower order radiation as well as higher order radiation is excluded. This may in many instances remove the necessity of utilizing multiple gratings.

Figure 5:
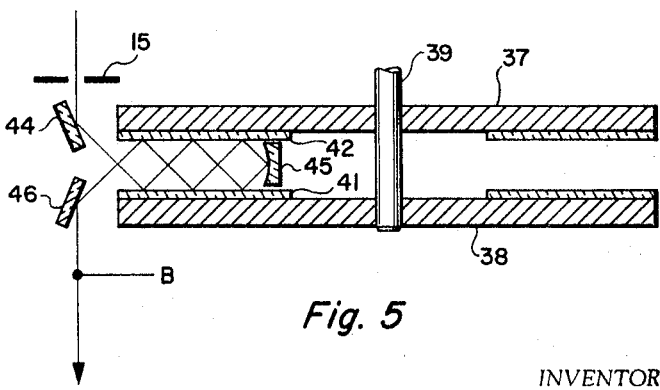
FIG. 5 illustrates an alternative embodiment of the invention using a reflection type filter.

The discussion thus far and the embodiments illustrated contemplate the use of an interference filter of the transmission type. This is not, however, an essential feature of the invention in that reflective interference filters may likewise be utilized and have major advantages in the short wavelength regions of the visible and ultraviolet. FIG. 5 illustrates an alternative embodiment of the interference filter portion of the device which utilizes an interference filter of the reflection type. Substrates 37 and 38 are mounted on shaft 39 which may be driven by filter cam 27 (FIG. 1) by any suitable means. Deposited on substrates 37 and 38 are reflection interference filters 41 and 42 respectively.

Radiation leaving exit slit 15 is directed by mirror 44 onto filter 41 and any selected number of multiple reflections may occur between filters 41 and 42 before the beam is interrupted by focusing mirror 45. Mirror 45 redirects the radiation back along a multiple reflection path to mirror 46. By appropriate selection of mirrors 44, 45 and 46 the image of the exit slit 15 may be reformed at B. A second slit may be placed at B if desired.

Interference filters of the reflection type have the advantage that many types of substrate material may be utilized since the substrate need not be highly transmissive in the spectral region involved, thus removing a highly limiting criterial imposed upon the substrate material used for transmitting interference filters.

The number of reflections between the substrates is not critical except as may be imposed to improve the spectral purity of the selected wavelength. That is, in some instances, the interference filter of the reflectance type, although having a spectral characteristic similar to that illustrated in FIG. 3, will reflect a few percent in all regions of the spectrum. Thus the system may contain 4 or 5% radiation in all regions. This undesired radiation may be reduced to a negligible amount by multiple reflections with only a slight decrease in the energy at the selected wavelength. If the spectral characteristic of the filter is sufficiently pure, only one reflection may be necessary and the multiple reflections of FIG. 5 may be done away with entirely. Further, it should be understood that even though multiple reflections are desired, the second filter may be replaced by a plane mirror without significantly affecting the operation of the system.

Obviously, other mechanisms may be utilized for synchronously driving the variable interference filter and the dispersing element. For example, synchronous drive motors may be utilized or various gear drives could be substituted. Construction of the interference filter as a linear function of angle or position is not a requirement of this invention although such construction greatly simplifies the design of the driving mechanism.

Obviously many modifications and variations of the present invention are possible in light of the foregoing teachings and the foregoing disclosure relates only to a preferred embodiment of the invention. It is to be understood, therefore, that the invention may be practiced otherwise than as specifically described without departing from the spirit and scope of this invention.

What is claimed is:
1. In a monochromator, the combination comprising:
means defining a radiation beam path through said monochromator;
grating means positioned in said beam path for dispersing radiation passing said path;
scanning means for rotating said grating for scanning selected wavelengths along a path;
a reflection interference filter means;
means for directing radiation in said path to said reflection interference filter means;
reflective means positioned to receive radiation reflected from said reflection interference filter means and redirecting said radiaton to said reflection inter- ference filter means to provide multiple reflections of said radiation in said path by said reflection interference filter means;

means coupling said reflection interference filter means to said scanning means to drive said reflection interference filter means in synchronism with said grating whereby said filter means passes only a selected order of the radiation passing said path.

2. In the monochromator of claim 1 the combination further including:

said reflective means being a reflection interference filter;

means coupling said reflection interference filters for synchronous movement.

References Cited

UNITED STATES PATENTS 3,216,315 11/1965 Keller.
3,334,956 8/1967 Staunton.

FOREIGN PATENTS 1,314,569 12/1963 France.

RONALD L. WIBERT, *Primary Examiner.*

F. L. EVANS, *Assistant Examiner.*

U.S. Cl. X.R.

350—166